(12) United States Patent
Ekambaram et al.

(10) Patent No.: US 10,387,556 B2
(45) Date of Patent: Aug. 20, 2019

(54) DISPLAYING SUPPLEMENTAL INFORMATION ABOUT SELECTED E-BOOK OBJECTS

(71) Applicant: INTERNATIONAL BUSINESS MACHINES CORPORATION, Armonk, NY (US)

(72) Inventors: Vijay Ekambaram, Tamilnadu (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 358 days.

(21) Appl. No.: 15/295,011

(22) Filed: Oct. 17, 2016

(65) Prior Publication Data

US 2018/0107638 A1    Apr. 19, 2018

(51) Int. Cl.
*G06F 17/24* (2006.01)
*G06F 3/0482* (2013.01)
(Continued)

(52) U.S. Cl.
CPC .......... *G06F 17/241* (2013.01); *G06F 1/1626* (2013.01); *G06F 1/1686* (2013.01);
(Continued)

(58) Field of Classification Search
CPC ...... G06F 3/0482; G06F 17/24; G06F 3/0481; G06F 3/04883; G06F 17/241; G06F 3/013; G06F 3/012; G06F 3/0483; G06F 1/1626; G06F 1/1686; G06F 3/17; G06F 3/0304; G06F 2203/011; G06K 9/0061; G06K 9/00302; G06K 9/00456; H04W 4/30

See application file for complete search history.

(56) References Cited

U.S. PATENT DOCUMENTS 7,836,094 B2    11/2010  Ornstein et al.
8,249,563 B1 *   8/2012  Myers ............... H04M 3/42348
                                                   455/414.1
(Continued)

FOREIGN PATENT DOCUMENTS

WO    2014072767 A1    5/2014

*Primary Examiner* — Tuyetlien T Tran
(74) *Attorney, Agent, or Firm* — Michael O'Keefe; Matthew M. Hulihan; Heslin Rothenberg Farley & Mesiti PC

(57) ABSTRACT

Display of supplemental information about selected e-book object. A method identifies relationships between objects of a plurality of objects presented in an electronic book. The plurality of objects include character and non-character objects presented in the electronic book. The method selects a first object, of the plurality of objects, presented on a display of an electronic device as part of presenting the electronic book on the display. A determination is made as to which of the identified relationships is between the first object and one or more second objects of the electronic book and has been presented in displayed portions of the electronic book. This determination indicates at least one relationship of the identified relationships. The method displays supplemental information about the selected first object, the supplemental information including one or more depictions of the indicated at least one relationship.

19 Claims, 8 Drawing Sheets

(51) Int. Cl.
*G06K 9/00* (2006.01)
*G06F 3/01* (2006.01)
*G06F 3/0483* (2013.01)
*G06F 3/0481* (2013.01)
*G06F 3/0488* (2013.01)
*G06F 1/16* (2006.01)
*G06F 3/03* (2006.01)
*H04W 4/30* (2018.01)

(52) U.S. Cl.
CPC .............. *G06F 3/012* (2013.01); *G06F 3/013* (2013.01); *G06F 3/017* (2013.01); *G06F 3/0304* (2013.01); *G06F 3/0481* (2013.01); *G06F 3/0482* (2013.01); *G06F 3/0483* (2013.01); *G06F 3/04883* (2013.01); *G06K 9/0061* (2013.01); *G06K 9/00302* (2013.01); *G06K 9/00456* (2013.01); *G06F 17/24* (2013.01); *G06F 2203/011* (2013.01); *H04W 4/30* (2018.02)

(56) References Cited

U.S. PATENT DOCUMENTS

| | | | |
|---|---|---|---|
| 8,842,085 B1* | 9/2014 | Goodspeed | G06F 17/21 345/173 |
| 9,009,022 B2 | 4/2015 | Yi et al. | |
| 9,047,784 B2 | 6/2015 | Brownlow et al. | |
| 2004/0018852 A1 | 1/2004 | Burke et al. | |
| 2011/0191692 A1 | 8/2011 | Walsh et al. | |
| 2012/0005616 A1* | 1/2012 | Walsh | G06F 17/30716 715/776 |
| 2015/0293632 A1 | 10/2015 | Bullock | |
| 2015/0370453 A1 | 12/2015 | Kandekar et al. | |
| 2015/0379132 A1* | 12/2015 | Cho | G06F 17/30867 707/722 |

\* cited by examiner

DISPLAYING SUPPLEMENTAL INFORMATION ABOUT SELECTED E-BOOK OBJECTS

BACKGROUND

When a user reads an electronic book (also referred to herein as an e-book) presented on an electronic device, such as an e-book reader, the user may come across several character and non-character objects related to the novel or story. Character objects include human or non-human characters, and relationships exist between these characters, e.g. character X is the father of character Y, character Y is the brother of character Z who owns a pet dog D, character Z has a friend named P, etc. Example non-character objects include other proper nouns (e.g. objects and property), such as a car or house. Relationships also exist between character objects and non-character objects. For example, character X has a small house and a big house (both non-character objects), and character X sold his small house and purchased a car. Consequently, a given electronic book might present many different objects and relationships between different objects in the book.

SUMMARY

Many objects, details about those objects, and relationships between objects may be presented in an electronic book to the point where it becomes overwhelming for a reader to remember this information. This can inhibit the user's full appreciation of the content presented in the e-book. Sometimes the user has to reread some of the previous content to remember and understand this information, such as a relationship between an object and another object.

Shortcomings of the prior art are overcome and additional advantages are provided through the provision of a computer-implemented method. The method identifies relationships between objects of a plurality of objects presented in an electronic book. The plurality of objects include character and non-character objects presented in the electronic book. The method selects a first object, of the plurality of objects, presented on a display of an electronic device as part of presenting the electronic book on the display. The method determines which of the identified relationships is between the first object and one or more second objects of the electronic book and has been presented in displayed portions of the electronic book. This determination indicates at least one relationship of the identified relationships. The method displays supplemental information about the selected first object, the supplemental information including one or more depictions of the indicated at least one relationship.

Further, a computer program product including a computer readable storage medium readable by a processor and storing instructions for execution by the processor is provided for performing a method. The method identifies relationships between objects of a plurality of objects presented in an electronic book. The plurality of objects include character and non-character objects presented in the electronic book. The method selects a first object, of the plurality of objects, presented on a display of an electronic device as part of presenting the electronic book on the display. The method determines which of the identified relationships is between the first object and one or more second objects of the electronic book and has been presented in displayed portions of the electronic book. This determination indicates at least one relationship of the identified relationships. The method displays supplemental information about the selected first object, the supplemental information including one or more depictions of the indicated at least one relationship.

Yet further, a computer system is provided that includes a memory and a processor in communications with the memory, wherein the computer system is configured to perform a method. The method identifies relationships between objects of a plurality of objects presented in an electronic book. The plurality of objects include character and non-character objects presented in the electronic book. The method selects a first object, of the plurality of objects, presented on a display of an electronic device as part of presenting the electronic book on the display. The method determines which of the identified relationships is between the first object and one or more second objects of the electronic book and has been presented in displayed portions of the electronic book. This determination indicates at least one relationship of the identified relationships. The method displays supplemental information about the selected first object, the supplemental information including one or more depictions of the indicated at least one relationship.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
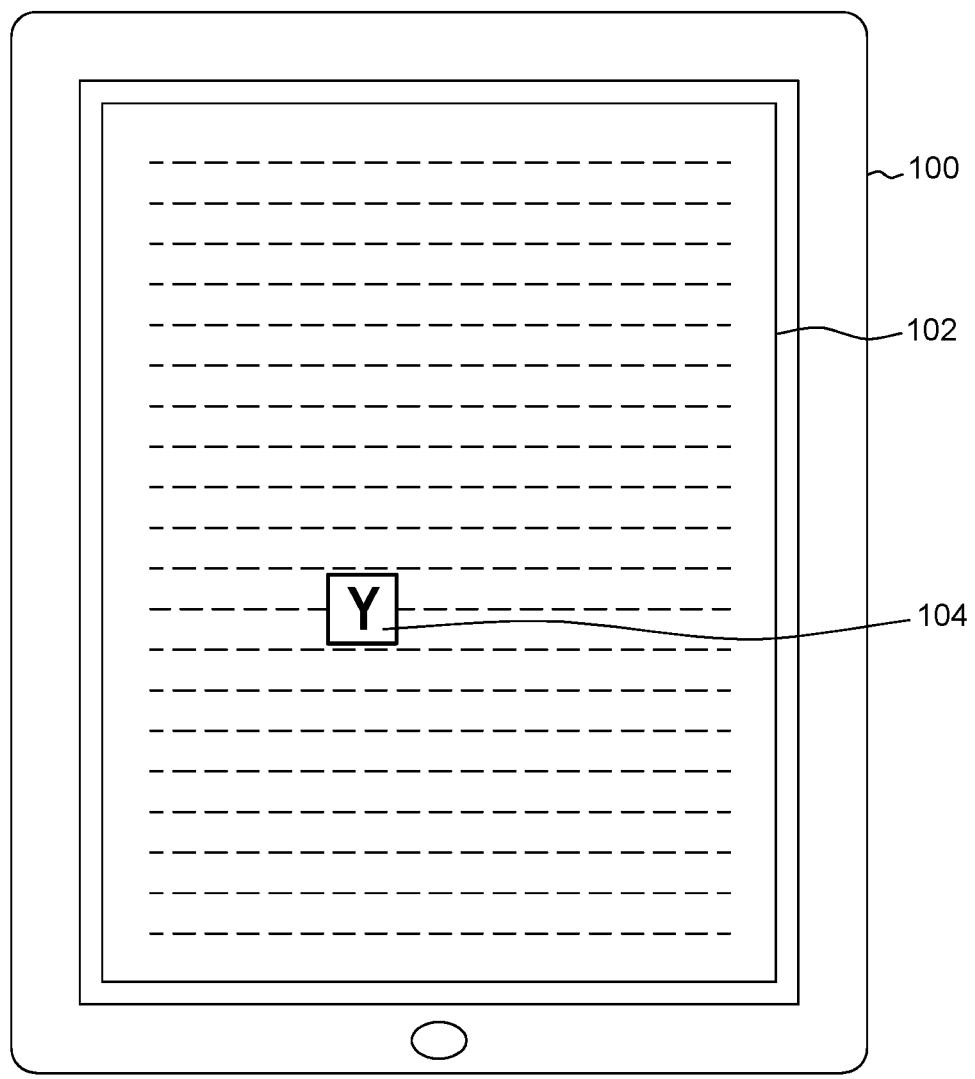
FIG. 1A depicts an example presentation of a page of an electronic book on a display of an electronic device.

Described herein are facilities for presenting supplementation information about selected objects presented in an electronic book, also referred to herein as an e-book. E-books are digital books, generally readable on a variety of different electronic devices including desktop and laptop computers, and mobile devices such as smartphones, tablets, and electronic reader ("e-reader") devices having a display to present the pages of the e-book to a user/reader. E-books may include content and genres that mirror those of traditional printed media, including fictional and non-fictional content, novels, textbooks, magazines, comics, newspapers, and the like.

The supplemental information presented when a user selects a given object can help the user easily recall details of the object and relationship(s) it has with other objects of the e-book.

In some examples, the provision of supplemental information may be triggered, automatically in some examples, based on recognizing an emotion (e.g. confusion, bewilderment, sadness, anger, etc.) of the user reading the content. Cameras may be used to detect facial expressions and consequently the emotional state of a user while the user reads the e-book. A look of confusion, for instance, may indicate that supplemental information about an object presented in the e-book would assist the user in understanding the content. Emotional state may be detected or conveyed in other ways, for instance by the user setting a mood in an application displaying the electronic book or by performing a hand gesture, as examples. If the detected emotion corresponds to a triggering emotional state, that can trigger the provision of the supplemental information. Emotion-based timely rendering of supplemental information including object relationship information can proactively address the reader's confusion and improve the reader's experience.

Additionally or alternatively, in some examples the supplemental information can be drawn from the reader's real-life information and generated content, such as pictures in the user's digital photo album.

By way of specific example, software installed on the electronic device can analyze e-book content and identify object information, such as the objects themselves, relationships between those objects, and/or any another other information about those objects. At least some of this identification may be assisted and/or verified using crowdsourced information. For instance, an initial analysis of the e-book content may be performed by the electronic device. Metadata including crowdsourced information may also be retrieved from a remote server as part of, or in conjunction with, the e-book. The electronic device might download the crowdsourced information with the e-book or separately. In some examples, the crowdsourced information is updated information that is downloaded subsequent to the initial download of the e-book, for instance when the user opens the e-reader application to read the e-book. In any case, at some point there may be a download of information that the device uses to identify and/or validate the identification of objects, object relationships, or other information related to the objects.

The crowdsourced information may be derived at least in part based on input from other readers to specify or correct information about objects, their relationships, etc. If a user recognizes a mistake in supplemental information presented to the user when reading the electronic book, the user may be able to make additions, modifications, or other edits to the supplemental information, which edits may be transmitted back to the remote server. The modifications can be incorporated into the crowdsourced information the is delivered to identify/validate object information on other reader's devices. Similarly, a user can create or augment supplemental information about an object, which may be transmitted back to the remote server and stored as crowdsourced information.

Based on a selection of one or more objects presented on the display of the electronic device, software can identify object information, such as the relationship(s) that the one or more objects have with other object(s), and display the relationship(s) in a graphical format as supplemental information. The supplemental information may be presented as an overlay of the e-book in the user interface. Examples of this are depicted and described below with reference to FIGS. 1B-1D.

Along with the relationship(s) among the objects, software can also display additional information about the objects. Additional information may include other information presented in the book about an object, such as a plot point that a selected Character X is brown haired. A selected object may be a non-fictional object, such as an actual tangible item, place, or the like. In these cases, the supplemental information can include information pulled from other sources (i.e. external to the e-book itself), such as information from websites like Wikipedia.org, or from user-generated content. Such information may be pictures, videos, facts, or any other information about the object.

In some examples, to the extent the supplemental information includes unrevealed information that has not yet been revealed to the reader, that unrevealed information may be hidden from display, or at least not included in the display of the supplemental content. For instance, a major plot point in the e-book may come midway into the book when character A has a child (character B). Aspects described herein may refrain from including that information (character B and the relationship between characters A and B) when presenting supplemental information about object A to a reader who has not yet read that portion of the e-book.

If a relationship between objects or any other object information is not correct, a user may have the option to correct the information and submit the correction to a remote server as crowdsourced information that the remote server provides to other user devices. The remote server can gather feedback from many user/readers and accordingly object information, such as a relationship between the object and another object, can be corrected based on consensus and stored as metadata on the server for provision to client devices.

When a user reads the e-book, software can track the user's eye-focus direction and movement. The user's associated emotional states (i.e. confused, excited, sad, etc.) may also be tracked, for instance using facial recognition technology. If the software identifies an emotional state of the user that is to trigger provision of supplemental information, the device can use this as a trigger to identify the object on which the user focuses when experiencing the emotional state. This may be done based on correlating the user's eye focus direction to a particular spot on the display of the electronic device, and the correlating that spot to an object presented in that spot. That object can be identified and selected as the object about which the supplemental information is to be displayed. This manner of rendering supplemental information based on the user's eye focus direction and emotional state can greatly improve the end-user experience with the electronic book.

In another aspect, a reading history of the user with respect to the displayed electronic book is maintained. Software can track which portion(s) of the electronic book have been read by the user (e.g. presented in portions displayed for the user, the content that the user has read so far in the book) and apply filtering on top of a complete object information model of the relationships and other information about the object identified from the above analysis. This filtering can focus on rendering only those relationships and other object information that have been revealed in portions that the user has read, e.g. from the beginning of the book to the point where the user is currently reading. In a particular example, relationships between objects are identified in a relationship graph with each node of the graph representing a respective object in the e-book. The filtering may hide/prevent the display of nodes in the object relationship graph that are not known to the user based on what the user has read from the e-book so far.

The reading history may additionally or alternatively include the user's reading history of other electronic books. This may be utilized to identify relationships between an object of the displayed electronic book and other electronic books. With the selection of an object in the displayed electronic book, software can identify and provide as part of the supplemental information depictions of relationships between the selected object and other objects presented in one or more of the other books in the user's reading history, and/or any other additional information, derived from one of the other books, about that selected object. Character X of e-book 1 may be related to Character Y of e-book 2, for instance because they both are part of a series by a similar author. As another example, an object in the current e-book may be a place (fictional or non-fictional) about which certain details are described in a related e-book that the user has read.

Additional aspects may tie e-book objects into real life information associated with the user. For example, a book might describe a street in Oxford, England. The user might select that object (the street name) presented in the e-book text displayed on the screen and software can retrieve user-generated content relating to the city of Oxford—for instance digital pictures that the user captured of that location during a visit in the past. The pictures may be displayed as at least a portion of the supplemental information when the street name is selected. As a further enhancement, when a user encounters, in real life, an object for which object information from the user's reading history is available, at least some of that object information may be provided to the user as a way of augmenting the user's experience with the object in real life. By way of specific example, if the electronic device (e.g. the user's smartphone) detects via a location sensor that the user is currently visiting a location that is an object mentioned in portions of e-book(s) indicated in the user's reading history, software can extract some or all of the object information about that location derived from the e-book(s) and present that information as an alert or other message to the user on the smartphone.

Aspects are further described with reference to FIGS. 1A-1D, showing an interface of an electronic device. FIG. 1A depicts an example presentation of a page of an electronic book on a display of an electronic device. Electronic device 100 includes a physical display showing a page 102 of an electronic book. Part of the e-book content is a particular object 104, represented with the letter Y (in this example Y is a character of the story).

Figure 1B:
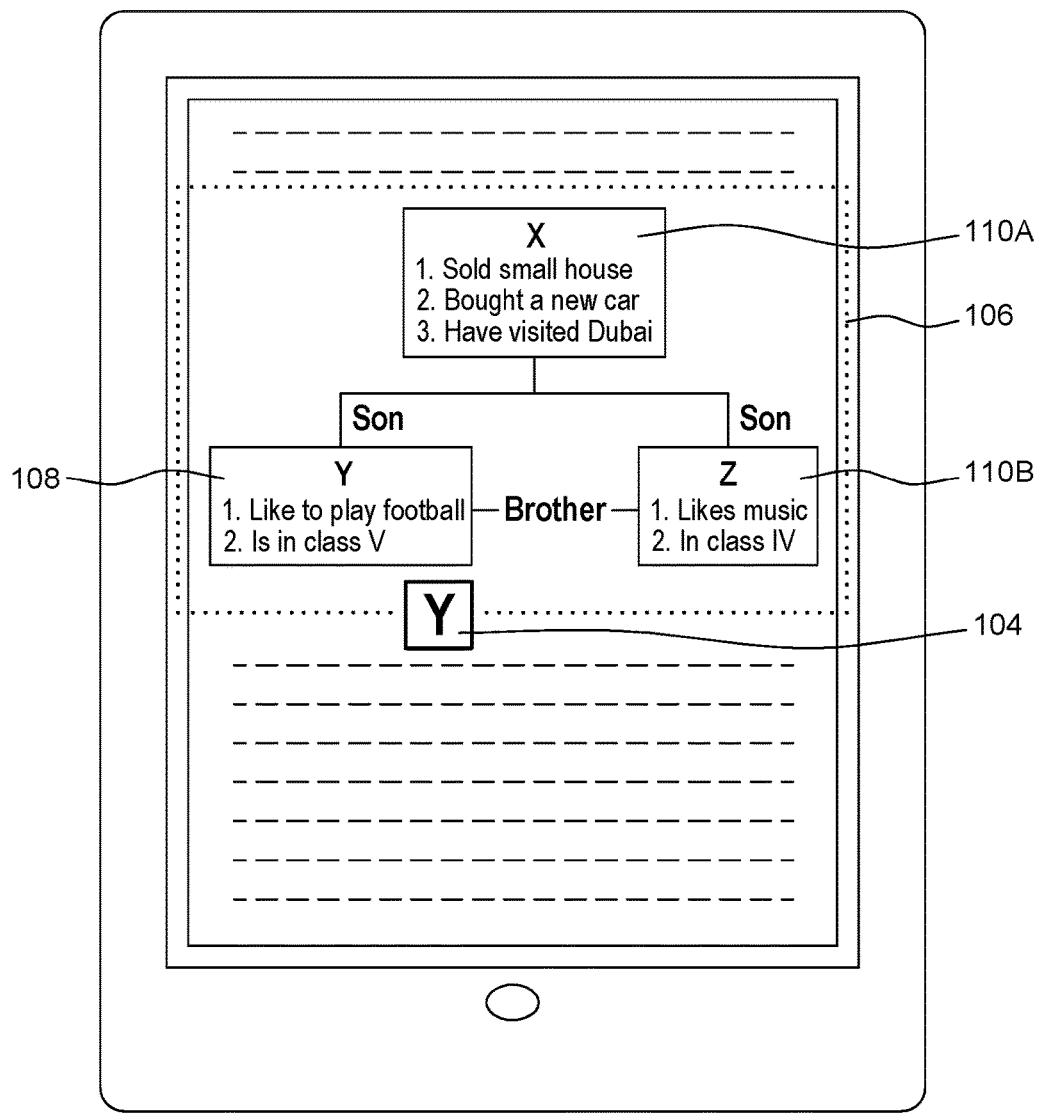
FIG. 1B depicts an example of presenting, on the display of the electronic device, supplemental information about a selected object presented in the electronic book, in accordance with aspects described herein.

FIG. 1B depicts an example of presenting, on the display of the electronic device, supplemental information about a selected object presented in the electronic book, in accordance with aspects described herein. In FIG. 1B, object Y has been selected and accordingly supplemental information is shown. The supplemental information is presented as an overlay to the e-book page in a pop-up overlay area 106. The supplemental information presents information 108 for object Y, in this case a character in the book. Information 108 indicates that Character Y likes to play football and is in a class V. The supplemental information also includes depictions of the relationships between Character Y and Characters X and Z. As seen in FIG. 1B, Character Y is the son of Character X and brother of Character Z, who is also a son of Character X. The supplemental information indicates two relationships between object Y and objects X and Z: a father-son relationship between Character X and Character Y, and a sibling relationship between Character Y and Character Z. The supplemental information also presents information (110A) about Character X and information (110B) about Character Z. In some examples, the presented supplemental information has been filtered from a larger set of supplemental information about object Y and/or other objects depicted in the supplemental information. For example, the supplemental information is only the information that has been presented to the user in portions that the user has read. Approaches are known for tracking, perhaps across devices, what portions of an e-book have been presented to (displayed for) a user. Other information about the object(s) that has not yet been presented to the user in the story may be withheld from display, for example so as to not confuse the user or reveal spoilers.

Figure 1C:
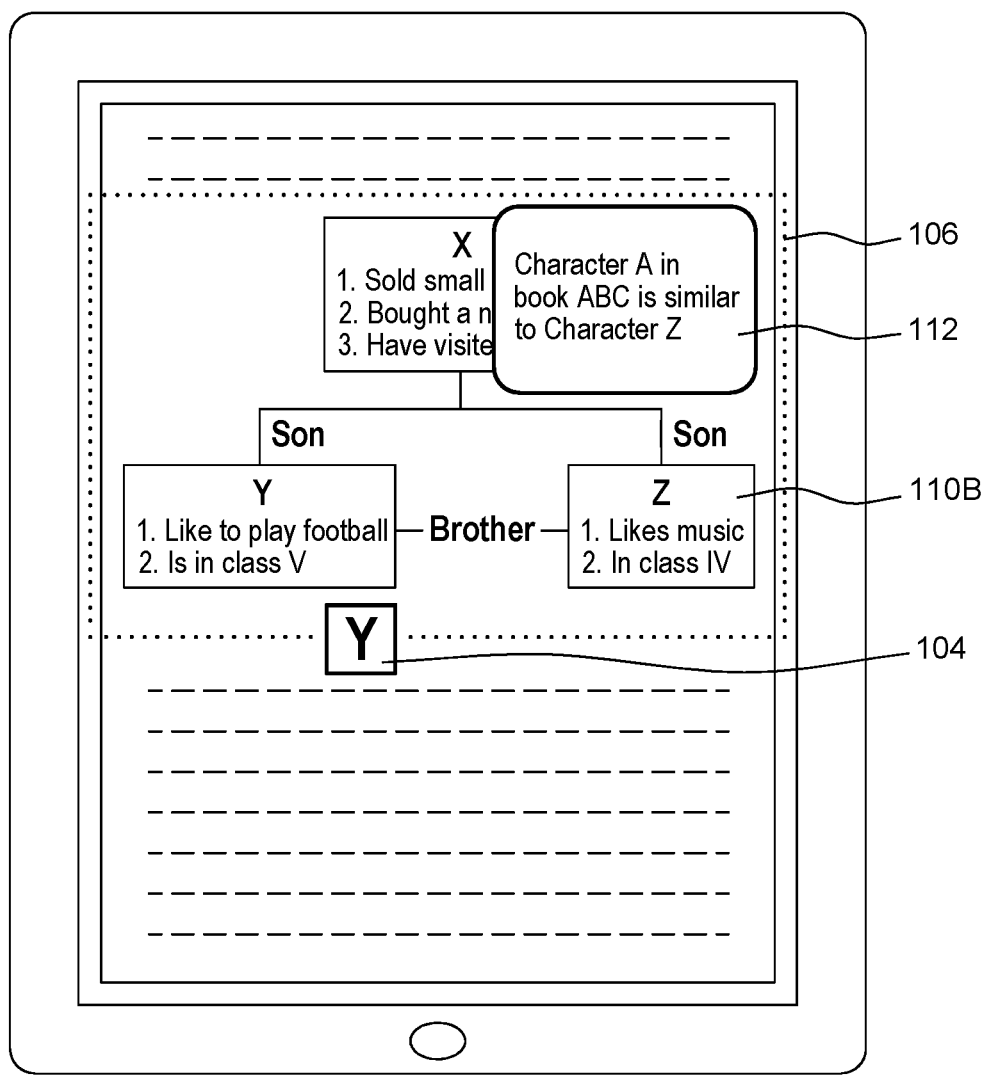
FIG. 1C depicts another example of presenting, on the display of the electronic device, supplemental information, in accordance with aspects described herein.

FIG. 1C depicts another example of presenting, on the display of the electronic device, supplemental information, in accordance with aspects described herein. This particular example builds on the example of FIG. 1B. The user has selected, hovered-over, etc. item 110B (corresponding to Character Z, a brother of the initially selected Character Y from the present e-book). Software reads the user's reading history of other electronic books and identifies that a Character A in book ABC has a relationship with Character Z of the present e-book. This additional information is presented as another pop-up 112 in this example. Also in this example, the relationship is similarity in the two characters (for example perhaps the characters are from a common geographic area). Accordingly, the supplemental information can show how an object (character, place, etc.) is related to other books that user has read.

Figure 1D:
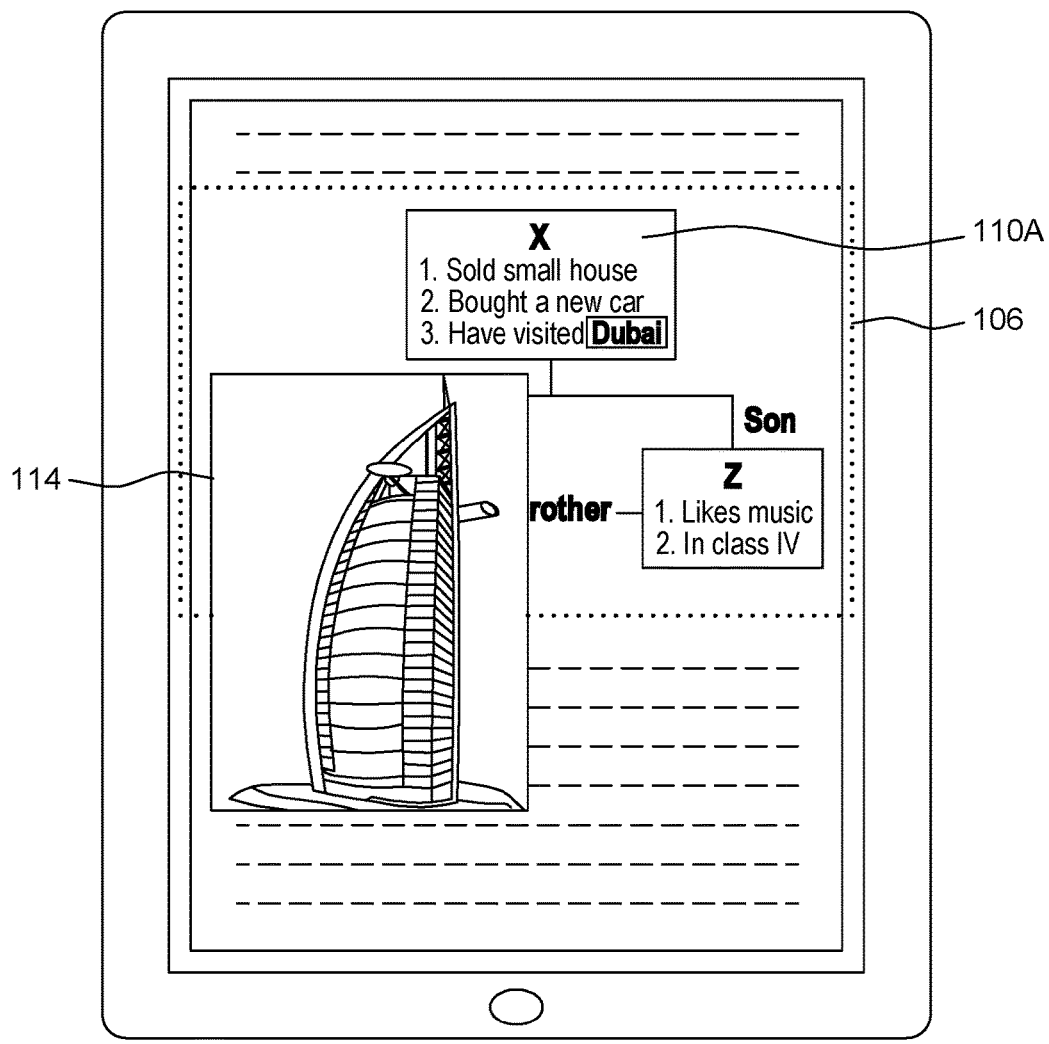
FIG. 1D depicts another example of presenting, on the display of the electronic device, supplemental information, in accordance with aspects described herein.

FIG. 1D depicts another example of presenting, on the display of the electronic device, supplemental information, in accordance with aspects described herein. In this example, an object is mapped to real-life information. Part of the supplemental information includes information 110A about related Character X. Information point 3 indicates that Character X has visited Dubai (information derived from content of the e-book or perhaps another e-book in the user's reading history). Here, the object Dubai has been selected and consequently a picture 114 of a famous building in Dubai is depicted as part of the supplemental information. In some examples, the picture is selected from the user's collection or digital photo album of pictures. In other examples, the picture is harvested from the internet or another source and displayed for the user. In any case, the image 114 may be a single image or may be a scrollable slideshow of images. Various approaches may be applied to selected the image(s) or other supplemental information chosen for display. For instance, in the case of an image, the image may be selected based on being most viewed or most liked on a social media platform to which the image was posted.

In this manner, supplemental information may be provided about any of several different objects—either the initially selected object (Character Y in these examples) and/or other objects that are themselves part of the supplemental information about the initially selected object. Thus, information 112 and 114 in the examples of FIGS. 1C and 1D relate to objects that are themselves part of other supplemental information (i.e. instead of being directly about the selected object Character Y), though it should be appreciated that these types of supplemental information derived from other e-books in the user's library (e.g. 112) or from user-generated content (e.g. 114) may be provided about the initially selected object (Character Y).

Figure 2:
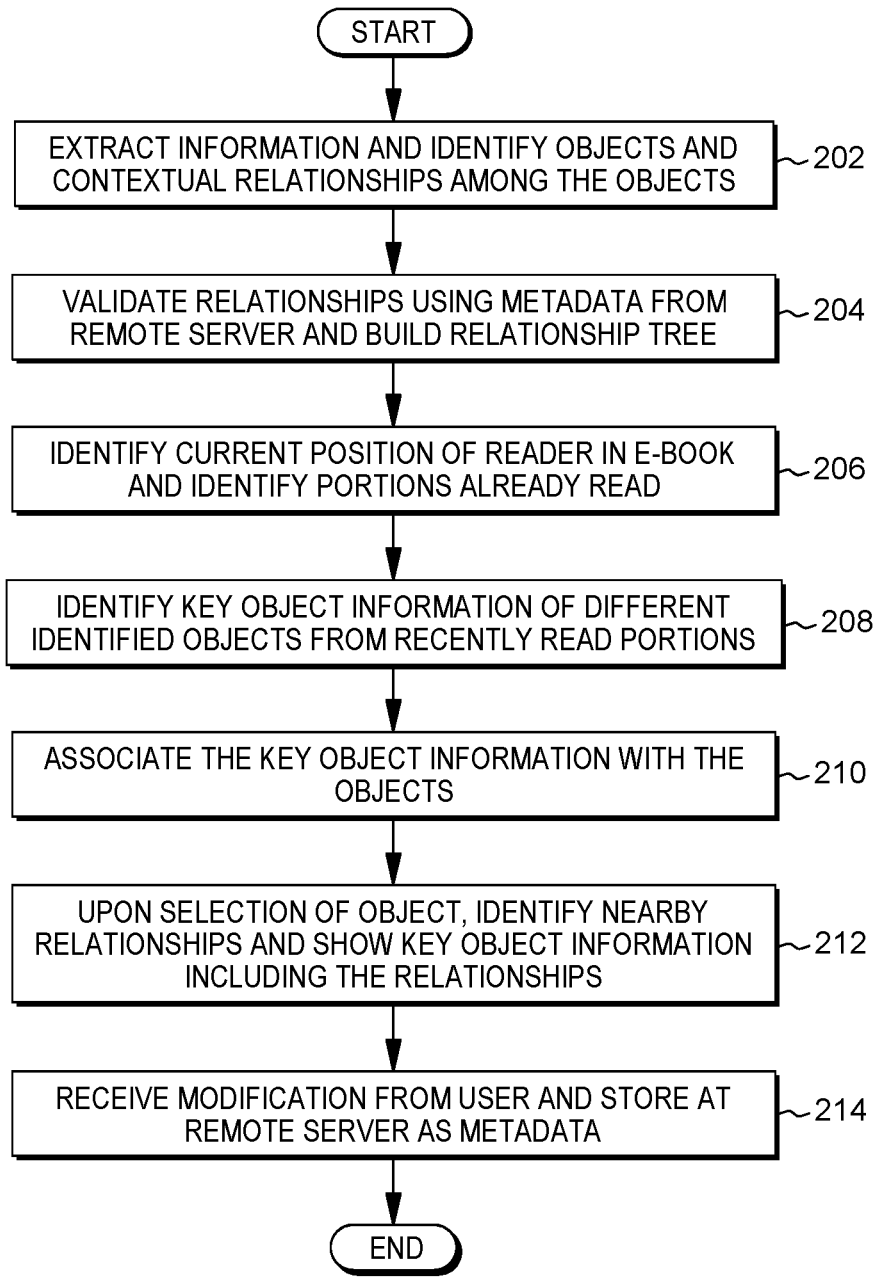
FIGS. 2-3 depict example processes for providing supplemental information about a selected e-book object, in accordance with aspects described herein.

FIG. 2 depicts an example process for providing supplemental information about a selected e-book object in accordance with aspects described herein. Aspects of the process of FIG. 2 may be performed by one or more computer system(s), such as an e-reader, tablet, smartphone, desktop, laptop, or other electronic device of a user, a remote computer system in communication with such an electronic device, or a combination of the two, as examples.

The process begins when an e-book is opened. Software installed on the electronic device can extract information about the content of the e-book and identify objects and contextual relationship among the objects (202). Meanwhile, a remote server maintains metadata where different names of relationships are defined. The metadata is provided/downloaded as part of the electronic book or is provided/downloaded to the electronic device separate from the e-book. Once the objects and contextual relationship among the objects are identified, the process continues by validating the relationships using the metadata from the remote server and building a relationship tree relating the related objects to each other (204). A current position of the reader in the e-book is identified (e.g. by detecting what page the reader is one), as are the portions of the e-book that the reader has already read (206). The process extracts key object information of different identified objects from the recently read content/portions of the e-book (208). This may be used to limit the supplemental information delivered to the user upon a later selection of an object. A user may have read only the first 10 pages of the e-book. If the supplemental information shown upon selecting an object on page 10 were to show information about the object from portions of the entire book, this might confuse the reader and reveal spoilers. Instead, the focus of the supplemental information may be content that the user has already read. The key object information from the recently read content is then associated with the objects (210).

Upon a selection of the object, which might be a user's touch-based selection of the object as one example, the process identifies nearby relationships and shows key object information including the relationships from the recently read content (212). The information can include the closest relationships—for instance if the object is part of a large family tree, the information could include only the relatives nearest the object in the tree (e.g. one generation above, one generation below). This can be a configurable user preference. Accordingly, software can track the user's reading history and apply filtering on top of the complete object relationships extracted above, so that only information included in portions that the user has read are shown. Other nodes in the object relationship tree may remain hidden, providing clarity to the user by hiding the objects/characters yet to be read about.

In some embodiments, the selection of the object is not a touch-based or other selection based on user input, per se, but is instead based on tracking the reader's eye movement and apparent emotional state as conveyed by facial or other both language. Whenever the user reads the e-book, software can track the eye-focus movements and the user's associated emotional states (i.e. confused, excited, sad, etc.), and if the software identifies the user's eye focus remains on a word while the user exhibits a confused emotional state, then that can trigger the showing of the key object information (supplemental information).

Additionally, the reader can have the option to correct the supplemental information, such as details of a relationship between the object and other object(s), and accordingly the remote server can receive the modifications, analyze the received modifications data from the user, and store the corrected information, such as the relationship details (214). The correction may be stored as metadata and provided to other electronic devices, e.g. during a content analysis or validation process for identifying the objects and information in the e-book.

The user's reading history of other books may be tapped for additional information. Upon selection of an object (such as a character name or a place), the supplemental information shown can include object information from the other books of objects related to the selected object. For example, a selected Character X in the current e-book may be related to Character Y in another book that the user has read by the same author, or a selected Place X in the current e-book may have been discussed in another book the user read years ago. Both such additional object information may be shown as part of the supplemental information displayed based on selection of the object in the current e-book.

Software can also tap into real life information for the supplemental information deliver upon object selection. The e-book may describe a street or other location in a city that the user visited. Selection of the location can cause the electronic device to retrieve the user's picture(s) of that location during the previous visit and display them as part of the supplemental information displayed. Conversely, if the user visits any location that the user has read about in an e-book, software can extract object information from the user's reading history and show the information related to the location while the user is present in that particular place.

Accordingly, crowdsourcing aspects of the contextual analysis of the e-book and discovery of accurate character/object relationships is provided. Aspects can gather reader feedback about various objects presented in the e-book. Crowdsourcing these feedback enables discovery and fine-tuning (i.e. correction, modification, edits, etc.) of the object information, such as that maintained in an object relationship graph. This can also facilitate quick, reliable identification of object information, including relationships, especially as the system becomes more intelligent as more crowdsourced data is collected from the readers.

Detection of the emotional state of the user when looking at different objects by using eye-tracking and facial recognition facilities (as examples), provides an intuitive way of rendering object relationship information based on the user's emotional state, improving the end-user experience and proactively providing helpful information to the user.

Basing the provided supplemental information on the user's reading history of the e-book (e.g. user has read up to page 10), can ensure that proper supplemental information is given to the user without revealing information that the user otherwise has not reached in the e-book. This ensures that unread information is not provided to the user beforehand, which might confuse the reader and potentially reveal spoilers that would degrade the reader experience.

Figure 3:
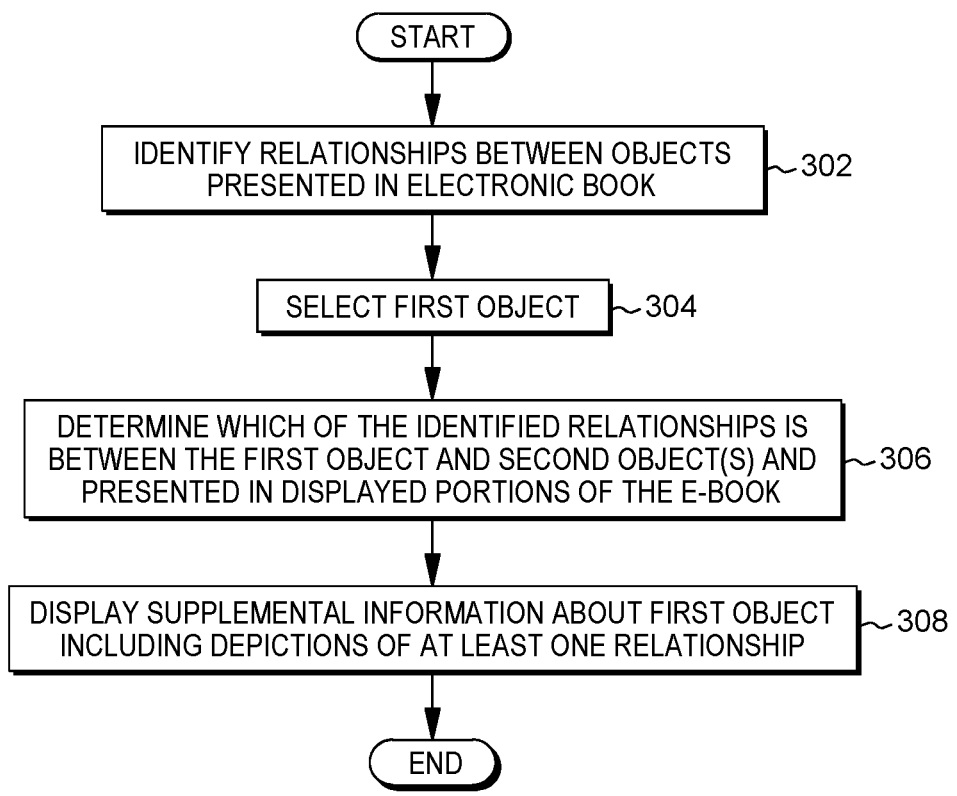

FIG. 3 depicts another example process for providing supplemental information about a selected e-book object, in accordance with aspects described herein. The process of FIG. 3 may be performed by one or more computer system(s), such as an e-reader or other electronic device of a user, a remote computer system in communication with such an electronic device, or a combination of the two, as examples.

The process of FIG. 3 begins by identifying relationships between objects of a plurality of objects presented in an electronic book (302). The plurality of objects can include character and non-character objects presented in the electronic book. The identification can also identify other information about each of the objects. As part of this identification, the process can receive and analyze content of the electronic book, where the analyzing identifies the plurality of objects and the relationships, receives relationship information from a remote server, validates the identified plurality of objects and the relationships against the received relationship information from the remote system, and builds a relationship tree based on the validated identified objects and relationships, as an example.

The identifying can additionally or alternatively include identifying the relationships from/based on received crowdsourced content information about content of the electronic book. In an example, the crowdsourced content information is pulled as metadata from a remote server that collects the crowdsourced content information.

The process of FIG. 3 continues by selecting a first object, of the plurality of objects, presented on a display of an electronic device as part of presenting the electronic book on the display (304), and determining which of the identified relationships is between the first object and one or more second objects of the electronic book and has been presented in displayed portions of the electronic book. The displayed portions correspond to the content in the book that the user has read (or at least has been presented for reading) so far. The determination of which of the identified relationships can indicate at least one relationship, of those identified relationships, that meets the above criteria, i.e. is between the first object and one or more second objects of the electronic book and has been presented in displayed portions of the electronic book.

The process then displays supplemental information about the selected first object, the supplemental information including one or more depictions of the indicated at least one relationship.

The selecting the first object may be performed by the electronic device based on receiving input from a user, such as touch input that selects the first object.

In a specific example, though not depicted, the process tracks eye focus direction and facial expressions of the user and determines an emotional state of a user as the user reads the electronic book, based on this tracking. It also determines that the determined emotional state corresponds to a triggering emotional state (confusion, sadness, or any other desired triggering emotional state) for triggering the display of the supplemental information. The selection of the first object (FIG. 3, #304) may be automatic based on the user viewing the first object with the determined emotional state. This can trigger the display of the supplemental information. The triggering can include automatically displaying the supplemental information, i.e. without first receiving an affirmative command by the user to do so. Alternatively, the triggering can include providing an indication to the user that the supplemental information is available for display, and presenting a selection for the user to confirm that the supplemental information is to be displayed. In any case, the process can then perform the display of the supplemental information based on the emotional state of the user corresponding to the triggering emotional state that triggers the display of the supplemental information.

In some examples, the supplemental information further includes additional information presented in the electronic book about the first object that has been presented in the displayed portions of the electronic book. The additional information can include non-fictional information. The process can include identifying user-generated media (pictures, video, etc.) about the non-fictional information, the user-generated media being generated by the user of a user account for which the electronic book is displayed, and displaying the user-generated media as part of the supplemental information.

The process of FIG. 3 can also include receiving, based on displaying the supplemental information, a modification to the supplemental information. The modification may come from a user as a corrective action to correct information provided in the supplemental information. The modification can be provided to a remote server as crowdsourced content information about content of the electronic book.

In some examples a reading history, of other electronic books, of a user account for which the electronic book is displayed is maintained and the process further includes identifying one or more relationships between the first object and one or more other objects presented in at least one other electronic book, of the other electronic books, in the reading history, and depicting the identified one or more relationships as part of the supplemental information.

Additionally or alternatively, selection of one or more other objects, of the plurality of objects, displayed as part of the supplemental information may be enabled so that the supplemental information displayed can be augmented with layers of supplemental information. Based on selection (e.g. by a user or by tracking eye focus direction and emotional state of the user) of another object of the one or more other objects, additional supplemental information may be displayed about the selected another object.

Further, location of the electronic device may be tracked. The process can include detecting that the electronic device is located in a location presented in the displayed portions of the electronic book (e.g. portions of the subject electronic book that have been presented to the user), and then providing content of the electronic book relating to that location to the user of the electronic device. As a specific example, if the user visits a famous landmark that the user read about in an e-book (fictional or non-fictional), some details about the landmark coming from the e-book can be presented to the user, to correlate real-life activities to content about which the user previously read.

Described herein are approaches for displaying supplemental information about selected e-book objects. Improvements in at least e-reader and other electronic devices, as well as the field of electronic books and user experiences associated therewith are provided. Processes described herein may be performed singly or collectively by one or more computer systems, such as computer system(s) described below with reference to FIG. 4. In some embodiments, such a computer system may be, include, or be incorporated into a mobile device.

Figure 4:
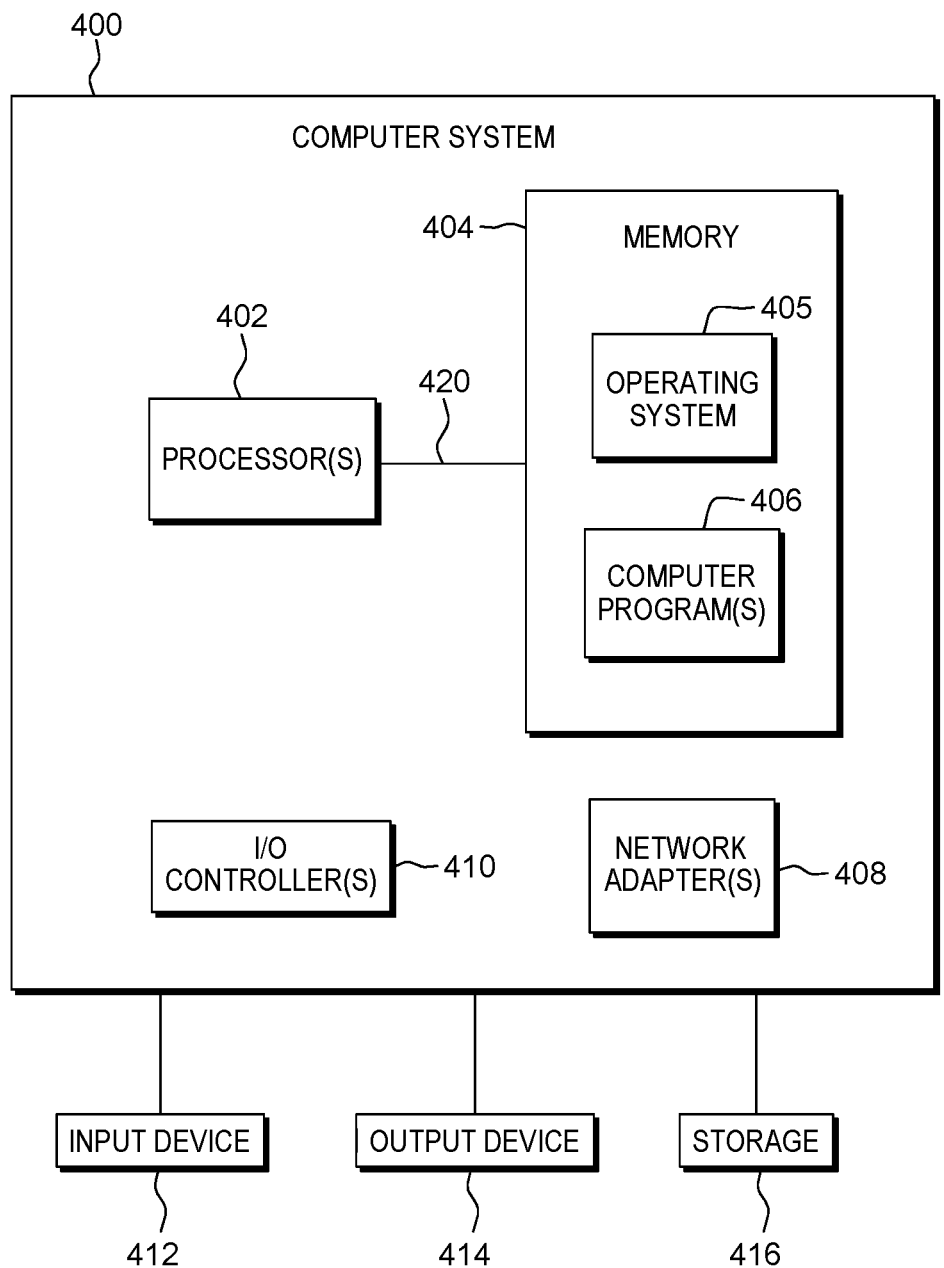
FIG. 4 depicts an example of a computer system to incorporate or use aspects described herein.

FIG. 4 depicts one example of a computer system to incorporate or use aspects described herein. A computer system may also be referred to herein as a data processing device/system or computing device/system, or simply a computer. Computer system 400 may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance an e-reader software application to perform aspects described herein, such as those described with reference to FIGS. 2 and/or 3, as examples.

Input/Output (I/O) devices 412, 414 (including but not limited to displays, microphones, speakers, accelerometers, gyroscopes, magnetometers, light sensors, proximity sensors, GPS devices, cameras, etc.) may be coupled to the system either directly or through I/O controllers 410.

Network adapter(s) 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer systems.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may be or include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 5:
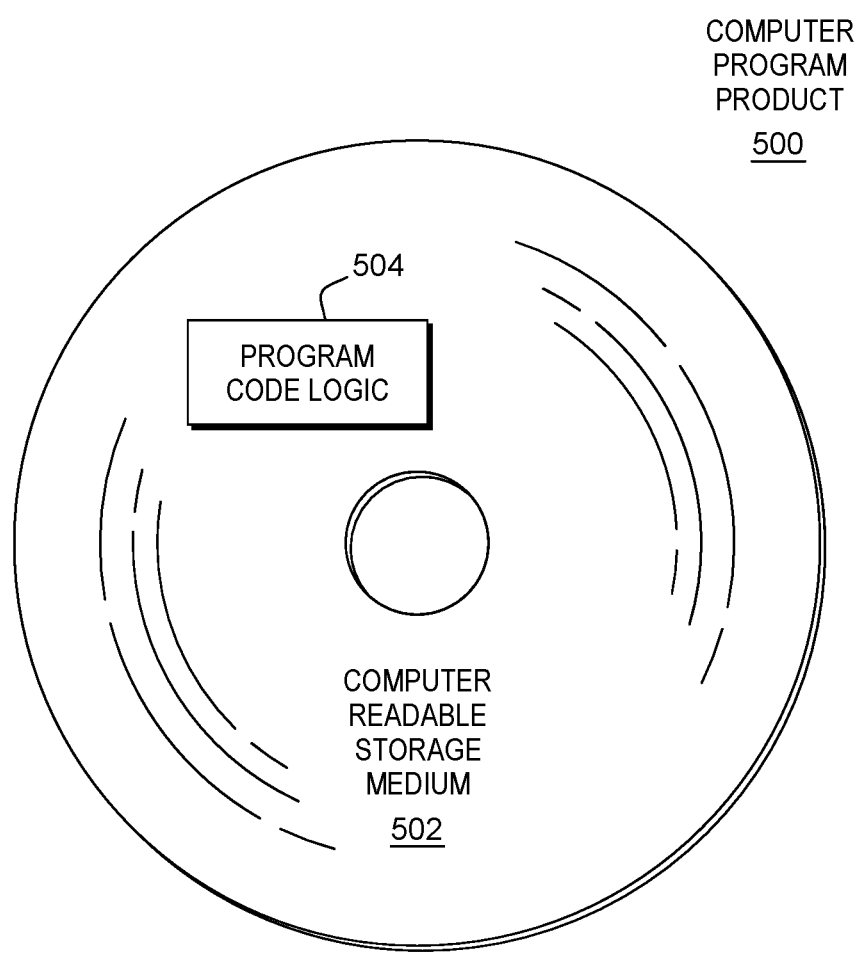
FIG. 5 depicts one embodiment of a computer program product.

Referring to FIG. 5, in one example, a computer program product 500 includes, for instance, one or more computer readable storage media 502 to store computer readable program code means, logic and/or instructions 504 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
identifying relationships between objects of a plurality of different objects presented in an electronic book, the plurality of different objects comprising character and non-character objects presented in the electronic book, wherein the identifying comprises:
obtaining crowdsourced content information about content of the electronic book, and identifying one or more relationships of the identified relationships from the crowdsourced content information, the crowdsourced content information including information contributed from multiple different contributors and specifying the one or more relationships of the identified relationships;
selecting a first object, of the plurality of objects, presented on a display of an electronic device as part of presenting the electronic book on the display;
determining which of the identified relationships is between the first object and one or more second objects, different from the first object, of the electronic book and has been presented in displayed portions of the electronic book, the determining indicating at least one relationship of the identified relationships; and
displaying supplemental information about the selected first object, the supplemental information comprising one or more depictions of the indicated at least one relationship, the displaying comprising overlaying content of the electronic book with graphical elements that each represent a respective object of the first object and the one or more second objects and that graphically depict the indicated at least one relationship in a hierarchy, a layout of which is determined based on the identified at least one relationship, and wherein a graphical element of the graphical elements displays a third object of the plurality of objects, the third object being different from the first object and the one or more second objects, and the third object having information associated therewith for display on the electronic device as additional supplemental information based on user selection of the third object.

2. The method of claim 1 further comprising:
determining an emotional state of a user as the user reads the electronic book; and
performing the displaying the supplemental information based on the emotional state of the user corresponding to a triggering emotional state that triggers the display of the supplemental information.

3. The method of claim 2, further comprising:
tracking eye focus direction and facial expressions of the user;
determining the emotional state of the user based on the tracking;
determining that the emotional state corresponds to the triggering emotional state;
automatically selecting the first object based on the user viewing the first object with the determined emotional state; and
triggering the display of the supplemental information, wherein the triggering is selected from the group comprising: (i) automatically displaying the supplemental information, and (ii) providing an indication to the user that the supplemental information is available for display and presenting a selection for the user to confirm that the supplemental information is to be displayed.

4. The method of claim 1, further comprising receiving, based on displaying the supplemental information, a modification to the supplemental information, and providing the modification to a remote server as crowdsourced content information about content of the electronic book.

5. The method of claim 1, wherein the supplemental information further comprises additional information presented in the electronic book about the first object that has been presented in the displayed portions of the electronic book.

6. The method of claim 5, wherein the additional information comprises non-fictional information, and wherein the method further comprises:
  identifying user-generated media about the non-fictional information, the user-generated media being generated by a user of a user account for which the electronic book is displayed; and
  displaying the user-generated media as part of the supplemental information.

7. The method of claim 1, further comprising maintaining a reading history, of other electronic books, of a user account for which the electronic book is displayed, wherein the method further comprises:
  identifying one or more relationships between the first object and one or more other objects, different from the first object and the one or more second objects, presented in at least one other electronic book, of the other electronic books, in the reading history; and
  depicting the identified one or more relationships between the first object and one or more other objects as part of the supplemental information.

8. The method of claim 1, further comprising:
  enabling selection of the third object displayed as part of the supplemental information; and
  based on user selection of the third object, displaying the additional supplemental information about the selected another third object.

9. The method of claim 1, further comprising:
  tracking location of the electronic device;
  identifying locations that have been presented in a portion of the electronic book that a user has read;
  detecting based on the tracking that the electronic device is located in one of the identified locations that have been presented in a portion, of the electronic book, that the user has read; and
  based on detecting that the electronic device is located in one of the identified locations, providing content of the electronic book relating to that location to a user of the electronic device.

10. The method of claim 1, wherein the selecting the first object is performed by the electronic device based on receiving input from a user that selects the first object.

11. The method of claim 1, further comprising:
  receiving and analyzing content of the electronic book, wherein the analyzing identifies the plurality of objects and the relationships;
  receiving relationship information from a remote server;
  validating the identified plurality of objects and the relationships against the received relationship information from the remote system; and
  building a relationship tree based on the validated identified objects and relationships.

12. A computer program product comprising:
  a computer readable storage medium readable by a processor and storing instructions for execution by the processor for performing a method comprising:
    identifying relationships between objects of a plurality of different objects presented in an electronic book, the plurality of different objects comprising character and non-character objects presented in the electronic book, wherein the identifying comprises:
      obtaining crowdsourced content information about content of the electronic book, and identifying one or more relationships of the identified relationships from the crowdsourced content information, the crowdsourced content information including information contributed from multiple different contributors and specifying the one or more relationships of the identified relationships;
    selecting a first object, of the plurality of objects, presented on a display of an electronic device as part of presenting the electronic book on the display;
    determining which of the identified relationships is between the first object and one or more second objects, different from the first object, of the electronic book and has been presented in displayed portions of the electronic book, the determining indicating at least one relationship of the identified relationships; and
    displaying supplemental information about the selected first object, the supplemental information comprising one or more depictions of the indicated at least one relationship, the displaying comprising overlaying content of the electronic book with graphical elements that each represent a respective object of the first object and the one or more second objects and that graphically depict the indicated at least one relationship in a hierarchy, a layout of which is determined based on the identified at least one relationship, and wherein a graphical element of the graphical elements displays a third object of the plurality of objects, the third object being different from the first object and the one or more second objects, and the third object having information associated therewith for display on the electronic device as additional supplemental information based on user selection of the third object.

13. The computer program product of claim 12, wherein the method further comprises:
  determining an emotional state of a user as the user reads the electronic book; and
  performing the displaying the supplemental information based on the emotional state of the user corresponding to a triggering emotional state that triggers the display of the supplemental information.

14. The computer program product of claim 13, wherein the method further comprises:
  tracking eye focus direction and facial expressions of the user;
  determining the emotional state of the user based on the tracking;
  determining that the emotional state corresponds to the triggering emotional state;
  automatically selecting the first object based on the user viewing the first object with the determined emotional state; and
  triggering the display of the supplemental information, wherein the triggering is selected from the group comprising: (i) automatically displaying the supplemental information, and (ii) providing an indication to the user that the supplemental information is available for display and presenting a selection for the user to confirm that the supplemental information is to be displayed.

15. The computer program product of claim 12, wherein the supplemental information further comprises additional information presented in the electronic book about the first object that has been presented in the displayed portions of the electronic book, wherein the additional information comprises non-fictional information, and wherein the method further comprises:
    identifying user-generated media about the non-fictional information, the user-generated media being generated by a user of a user account for which the electronic book is displayed; and
    displaying the user-generated media as part of the supplemental information.

16. The computer program product of claim 12, wherein the method further comprises:
    tracking location of the electronic device;
    identifying locations that have been presented in a portion of the electronic book that a user has read,
    detecting based on the tracking that the electronic device is located in one of the identified locations that have been presented in a portion, of the electronic book, that the user has read; and
    based on detecting that the electronic device is located in one of the identified locations, providing content of the electronic book relating to that location to a user of the electronic device.

17. A computer system comprising:
    a memory; and
    a processor in communication with the memory, wherein the computer system is configured to perform a method, the method comprising:
        identifying relationships between objects of a plurality of different objects presented in an electronic book, the plurality of different objects comprising character and non-character objects presented in the electronic book, wherein the identifying comprises:
            obtaining crowdsourced content information about content of the electronic book, and identifying one or more relationships of the identified relationships from the crowdsourced content information, the crowdsourced content information including information contributed from multiple different contributors and specifying the one or more relationships of the identified relationships;
        selecting a first object, of the plurality of objects, presented on a display of an electronic device as part of presenting the electronic book on the display;
        determining which of the identified relationships is between the first object and one or more second objects, different from the first object, of the electronic book and has been presented in displayed portions of the electronic book, the determining indicating at least one relationship of the identified relationships; and
        displaying supplemental information about the selected first object, the supplemental information comprising one or more depictions of the indicated at least one relationship, the displaying comprising overlaying content of the electronic book with graphical elements that each represent a respective object of the first object and the one or more second objects and that graphically depict the indicated at least one relationship in a hierarchy, a layout of which is determined based on the identified at least one relationship, and wherein a graphical element of the graphical elements displays a third object of the plurality of objects, the third object being different from the first object and the one or more second objects, and the third object having information associated therewith for display on the electronic device as additional supplemental information based on user selection of the third object.

18. The computer system of claim 17, wherein the method further comprises:
    tracking eye focus direction and facial expressions of a user;
    determining, based on the tracking, an emotional state of the user as the user reads the electronic book;
    determining that the emotional state corresponds to a triggering emotional state that triggers the display of the supplemental information;
    automatically selecting the first object based on the user viewing the first object with the determined emotional state;
    triggering the display of the supplemental information, wherein the triggering is selected from the group comprising: (i) automatically displaying the supplemental information, and (ii) providing an indication to the user that the supplemental information is available for display and presenting a selection for the user to confirm that the supplemental information is to be displayed; and
    performing the displaying the supplemental information based on the emotional state of the user corresponding to the triggering emotional state.

19. The computer system of claim 17, wherein the supplemental information further comprises additional information presented in the electronic book about the first object that has been presented in the displayed portions of the electronic book, wherein the additional information comprises non-fictional information, and wherein the method further comprises:
    identifying user-generated media about the non-fictional information, the user-generated media being generated by a user of a user account for which the electronic book is displayed; and
    displaying the user-generated media as part of the supplemental information.

* * * * *